Patented May 6, 1930

1,757,497

UNITED STATES PATENT OFFICE

JAMES BADDILEY, PERCY CHORLEY, AND RAINALD BRIGHTMAN, OF MANCHESTER, ENGLAND, ASSIGNORS TO BRITISH DYESTUFFS CORPORATION LIMITED, OF MANCHESTER, ENGLAND, A COMPANY OF GREAT BRITAIN AND IRELAND

DYEING WITH AZO DYES

No Drawing. Application filed March 16, 1927, Serial No. 175,925, and in Great Britain April 16, 1926.

By this invention regenerated cellulose silks, such as viscose silk, are dyed in level shades with the dyestuffs obtained by combining suitable diazo compounds with compounds of the type

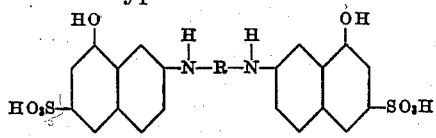

in which R represents a —CO— or —CS— group or a straight chain composed of two methylene or carbonyl groups or a combination of a carbonyl group with one or two methylene groups. Among these compounds four are already known, namely, those in which R is —CO—, —CS—, —CH$_2$.CH$_2$—, or —CH$_2$—CO—, but other compounds of the same general type can also be made.

For example, 8:8'-dihydroxy-2:2'-dinaphthyloxamide-6:6'-disulphonic acid

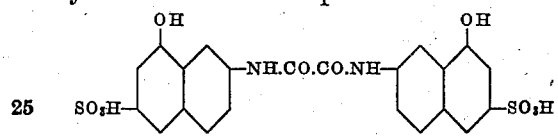

is obtained when oxalyl chloride is gradually added to a well-stirred solution of the sodium salt of 2-amino-8-naphthol-6-sulphonic acid in presence of excess of sodium acetate. The product is isolated by addition of common salt. Similarly, 8:8'-dihydroxy-2:2'-dinaphthyl - alpha - gamma - diamino - acetone-6:6'-disulphonic acid.

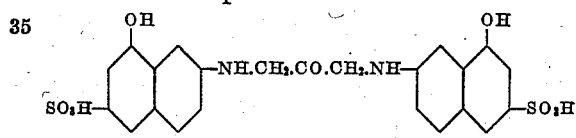

is obtained when a neutral solution of 478 parts of 2-amino-8-naphthol-6-sulphonic acid is added to a solution of 250 parts of alpha-gamma-dichloracetone in alcohol and the mixture heated at about 50° C. in presence of excess sodium acetate for several hours. The alcohol is then distilled off and the product isolated by addition of common salt.

As suitable diazo components there may be used aniline and its homologues or substitution products, including the sulphonic and carboxylic acids, and also naphthylamines and their sulphonic acids. For example, there may be used aniline, ortho anisidine, meta-aminobenzoic acid, sulphanilic acid, $p$-aminoacetanilide, $p$-chloraniline, $p$-nitroaniline and naphthionic acid, but it must be understood that our invention is not limited to these examples. The dyestuffs may be made by combining one or two molecules of a diazo compound or by combining one molecule of each of two different diazo compounds with the coupling components of the above general formula. If only one molecule of diazo compound is used, the dyestuffs obtained give dyeings which can be modified in shade and properties by developing on the fibre with suitable diazo compounds. In certain cases the shade of the dyeings can be modified by diazotizing on the fibre and developing with the usual developers.

Some of the dyestuffs of the aforementioned types are already known but they have not been adopted in the dyeing industries, probably because they possess only a poor affinity for cotton and have therefore no value for dyeing the cotton fibre. It was not to be foreseen that these dyestuffs would have a good affinity for regenerated cellulose silk, such as viscose silk, and in particular that they would have the property of dyeing such silks in level shades.

It is well known that the artificial silks made from regenerated cellulose give great difficulty in dyeing, owing to the fact that the fabric generally possesses an uneven avidity for the usual types of substantive cotton colours in consequence of which the dyeings obtained are unlevel. Our invention is therefore of great value in the art of dyeing regenerated cellulose silks.

These azo dyestuffs are dyed on the regenerated cellulose silks by the usual methods. The following is an example of the dyeing process but we in no wise limit ourselves to the details given therein:

*Example 1.*—The dyebath is made up from 3000 parts of water, 15 parts of Glauber's salt, 3 parts of soap and 2 parts of the symmetrical dyestuff obtained in the known manner by combining two molecules of otoluidine with one molecule of 8:8'-dihydroxy-2:2'-dinaphthylurea-6:6'-disulphonic acid and which, in the form of its sodium salt, may be represented by the formula

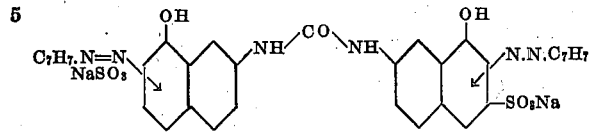

100 parts of the regenerated cellulose silk are entered into the bath warm and the bath is then raised nearly to the boil and the dyeing carried on for about ¾ hour. The fabric is then removed, rinsed and dried. Alternatively, the silk may be entered into the bath nearly at the boil and the bath allowed to cool gradually during the dyeing. Moreover, there may also be added to the dyebath other salts or dyeing assistance such as borax or sodium carbonate. The silk is dyed an even bright red shade. If instead of the dyestuff used in this example there be used the dyestuff obtained by combining one molecule of para-anisidine and one molecule of naphthionic acid with 1 molecule of 8:8'-dihydroxy-2:2'-dinaphthyl-alpha-beta-ethylenediamine-6:6'-disulphonic acid the silk is dyed an even red-brown shade. The dyeings obtained possess good fastness properties.

Other examples illustrating our invention are quoted in the following table:—

The components described have the property of coupling once in weak acid media (such as acetic acid) or twice in alkaline media. For unsymmetrical couplings we therefore use a weak acid for the first coupling and an alkali for the second.

What we claim and desire to secure by Letters Patent is:—

1. The process of dyeing regenerated cellulose materials in even, level shades which comprises applying to the said regenerated cellulose materials the azo dyes obtained by coupling X molecular proportions of a diazo compound with one molecular proportion of a compound having the general structural formula

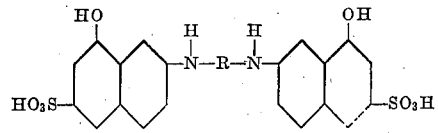

wherein R represents a —CO— or —CS— group, or a straight chain composed of two methylene or carbonyl groups or a combination of a carbonyl group with one or two methylene groups, and X is 1 or 2.

| Compound diazotized | Coupling component | Shade on viscose silk |
|---|---|---|
| Aniline (2 molecules) | 8:8' - dihydroxy - 2:2' - dinaphthylurea - 6:6' - disulphonic acid | Yellowish-red |
| m-xylidine (2 molecules) | Do. | Red |
| m-xylidine (1 molecule) | Do. | Red, changed to reddish-brown when developed with diazotized p-nitroaniline |
| p-nitroaniline (1 molecule) | Do. | Reddish-brown, becoming yellower when developed with diazotized p-nitroaniline |
| o-anisidine (2 molecules) | Do. | Crimson |
| Aniline (1 molecule) and p-aminoacetanilide (1 molecule) | Do. | Scarlet |
| Aniline (1 molecule) and m-aminobenzoic acid (1 molecule) | Do. | Scarlet |
| Aniline (1 molecule) | 8:8' - dihydroxy - 2:2' - dinaphthylurea - 6:6' - disulphonic acid | Scarlet |
| Aniline (1 molecule) and naphthionic acid (1 molecule) | Do. | Red |
| Aniline (1 molecule) and m-xylidine (1 molecule) | Do. | Red |
| p-chloroaniline (2 molecules) | Do. | Red |
| p-aminoacetanilide (2 molecules), the colour being hydrolyzed after coupling, in order to remove the acetyl groups | Do. | Violet. Dizaotized on the fibre and developed with β-naphthol, gives a blue-black shade. Developed with m-toluylenediamine gives a black shade, and with β-oxynaphthoic acid, a brown shade |
| Aniline (2 molecules) | 8:8' - dihydroxy - 2:2' - dinaphthylthiourea - 6:6'-disulphonic acid | Red |
| m-aminobenzoic acid (2 molecules) | Do. | Red |
| p-aminoacetanilide (2 molecules) the colour being hydrolyzed after coupling in order to remove the acetyl groups | Do. | Violet. Diazotized on the fibre and developed with β-naphthol gives a blue-black shade. Developed with m-toluylenediamine, gives a black shade |
| p-chloroaniline (2 molecules) | 8:8' - dihydroxy - 2:2' - dinaphthyl - α - B - ethylenediamine-6:6'-disulphonic acid | Brown |
| o-anisidine (2 molecules) | Do. | Brown. |
| p-aminoacetanilide (2 molecules), the acetyl groups being hydrolyzed after coupling | Do. | Violet-brown |
| p-chloroaniline (2 molecules) | N:N' - 8:8' - dihydroxy - 2:2' - dinaphthylglycinamide-6:6'-disulphonic acid | Red |
| Sulphanilic acid (2 molecules) | N:N' - 8:8' - dihydroxy - 2:2' - dinaphthylglycinamide-6:6'-disulphonic acid | Red |
| p-chloroaniline (2 molecules) | 8:8' - dihydroxy - 2:2' - dinaphthyloxamide - 6:6'-disulphonic acid | Pink |
| p-chloroaniline (2 molecules) | N:N' - 8:8' - dihydroxy - 2:2' - dinaphthyl - α - gamma-diamino-acetone-2:6'-disulphonic acid | Reddish-brown |
| 4-chloro-2-anisidine (2 molecules) | Do. | Brown. |

2. The process of dyeing regenerated cellulose materials in even, level shades which comprises applying to the said regenerated cellulose materials the azo dyes obtained by coupling two molecular proportions of a diazo compound with one molecular proportion of a compound having the general formula

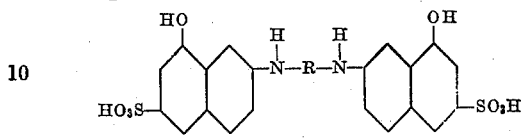

where R represents a —CO— or —CS— group, or a straight chain composed of two methylene or carbonyl groups or a combination of a carbonyl group with one or two methylene groups.

3. The process of dyeing regenerated cellulose materials in even, level shades which comprises applying to the said regenerated cellulose materials the azo dyes obtained by coupling two molecular proportions of a diazo compound with one molecular proportion of a compound having the general formula

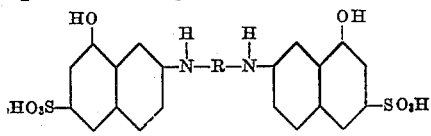

wherein, R represents —CO—, —CS—, —CH$_2$CH$_2$—, —CO—CO—, or —CH$_2$—CO—CH$_2$ groups.

4. The process of dyeing regenerated cellulose materials in even, level shades which comprises applying to the said regenerated cellulose materials the azo dyes obtained by coupling two molecular proportions of a diazo compound with one molecular proportion of a compound having the general formula

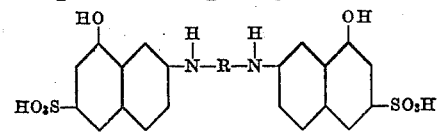

wherein R represents —CO— or —CS— groups.

5. The process of dyeing regenerated cellulose materials in even, level shades which comprises applying to the said regenerated cellulose materials the azo dyes obtained by coupling two molecular proportions of a diazo compound with one molecular proportion of 8:8'-dihydroxy-2:2'-dinaphthylurea-6:6'-sulphonic acid.

6. The regenerated cellulose materials dyed with the azo dyes obtained by coupling X molecular proportions of a diazo compound with one molecular proportion of a compound having the general structural formula

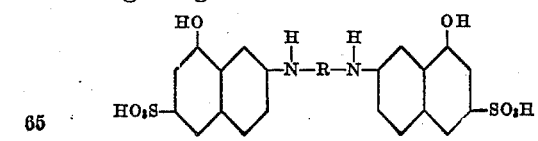

wherein R represents a —CO— or —CS— group, or a straight chain composed of two methylene or carbonyl groups or a combination of a carbonyl group with one or two methylene groups, and X is 1 or 2, the said dyed regenerated cellulose materials having an even, level shade.

7. The regenerated cellulose materials dyed with the azo dyes obtained by coupling two molecular proportions of a diazo compound with one molecular proportion of a compound having the general formula

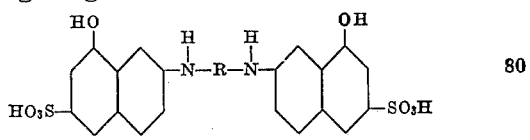

wherein R represents a —CO— or —CS— group, or a straight chain composed of two methylene or carbonyl groups or a combination of a carbonyl group with one or two methylene groups.

8. The regenerated cellulose materials dyed with the azo dyes obtained by coupling 2 mols of a diazo compound with one mol of a compound having the general structural formula

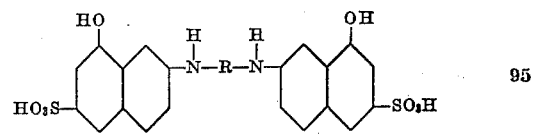

wherein R represents —CO—, —CS—, —CH$_2$CH$_2$—, —CO—CO—, or —CH$_2$—CO—CH$_2$ groups.

9. The regenerated cellulose materials dyed with the azo dyes obtained by coupling two molecular proportions of a diazo compound with one molecular proportion of a compound having the general formula

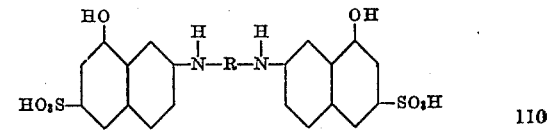

wherein R represents —CO— or —CS— groups.

10. The regenerated cellulose materials dyed with the azo dyes obtained by coupling two molecular proportions of a diazo compound with one molecular proportion of 8:8'-dihydroxy-2:2'-dinaphthylurea-6:6'-disulphonic acid.

In testimony whereof we affix our signatures.

JAMES BADDILEY.
PERCY CHORLEY.
RAINALD BRIGHTMAN.